Jan. 5, 1954
M. LESJAK
2,665,080
DEVICE FOR ATTACHING PERFORATED
FILM STRIPS TO SPOOL CORES
Filed Nov. 19, 1951
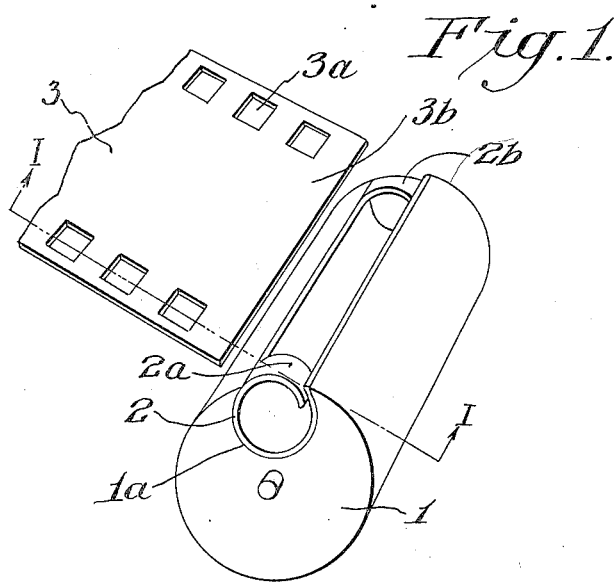
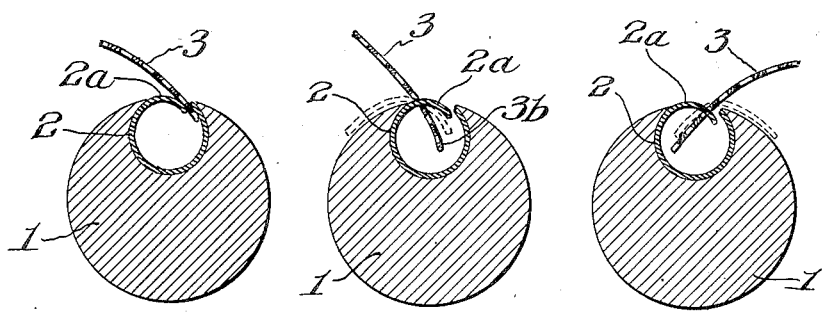
INVENTOR:
MICHAEL LESJAK, DECEASED
BY BABBETTE VIKTORIA LESJAK,
ADMINISTRATRIX
BY
HIS ATTORNEYS Patented Jan. 5, 1954

2,665,080

UNITED STATES PATENT OFFICE 2,665,080

DEVICE FOR ATTACHING PERFORATED FILM STRIPS TO SPOOL CORES

Michael Lesjak, deceased, late of Goggingen, Germany, by Babette Viktoria Lesjak, executrix, Goggingen, Germany Application November 19, 1951, Serial No. 257,168

Claims priority, application Germany November 25, 1950

3 Claims. (Cl. 242—74)

My present invention relates to a device for attaching perforated film strips to spool cores. More particularly, it concerns such a device including hooks for the film perforations and permitting winding of the film in either direction without substantial bending of the film end.

In known devices for attaching film strips to spool cores such as clamps, springs, loops and the like one usually encounters the disadvantage that the film can be wound only in one direction without subjecting the attached end to sharp bending and thereby to the danger of breaking or other injury. It is the main object of my invention to avoid this disadvantage by means of a very simple yet effective hooking device within the spool core.

The novel hooking device in accordance with my invention is so constructed and arranged that the end of the perforated film strip can easily be hooked therein and when turning the spool in both directions (clockwise and counterclockwise) is bent through an angle totaling less than 90 degrees. My hooking device comprises a pair of curved hooks or tongues for the perforations at the end of the film strip that are recessed within the spool core in such a manner that a portion of their outer curvature is exposed at the circumference of the core and a channel is left between the ends of the exposed portions towards the hook ends and the core circumference through which the end of the film strip may be introduced. The recess space within the interior curvature of the hooks will enable the hooked end of the film strip to swing throughout a large angle without bending, when the direction of winding of the film on the spool core is reversed. The hooks or tongues should fit loosely within the film perforations, particularly their thickness should be much less than the height of the perforations, to permit the free swinging of the film end.

A preferred embodiment of my film attaching means is a tubular insert with slightly overlapping edges. In order to form the hooks, the middle part of the interior overlapping portion is cut away, thus leaving hooks at each end of the insert, which are spaced apart the same distance as the perforations on the film. This tubular insert is placed within a corresponding recess or trough at the circumference of the spool core in such a manner that the hooks are exposed and the straight edge of the exterior overlapping portion is substantially flush with the circumference of the core. In this manner a channel is formed between the overlapping edges through which the end of the perforated film may be introduced.

Spool cores with the film attaching means of my invention may be employed for the most varied purposes. Such spool cores are particularly suited for use in daylight developing tanks wherein the film is alternately wound in opposite directions. Such a daylight developing tank is disclosed in my copending application Serial No. 257,167, filed November 19, 1951.

The preferred embodiment of my invention is illustrated in the accompanying drawings. Many modifications embodying the principle disclosed will immediately be apparent to those skilled in the art and my invention is not limited to the details shown.

In the drawings:

Fig. 1 is a perspective view of a spool core provided with the hooking device of my invention and shows the end of the perforated film strip to be hooked therein, Fig. 2 is a cross section of the spool core along the line I—I of Fig. 1 showing the end of the film strip as it is being introduced.

Fig. 3 is the same view as Fig. 2 except that it shows the hooked film end as it is being wound in a clockwise direction, and Fig. 4 is again the same view but shows the hooked film end as it is being wound in a counterclockwise direction.

Referring to the drawings, the spool core 1 has a trough 1a into which the tubular insert 2 is introduced. This insert preferably consists of a sheet metal tube having slightly overlapping edges whose interior overlapped portion is so cut out that the remaining edge portions form two tongues 2a and 2b that are exposed at the circumference of the core. The straight edge of the exterior overlapping portion of the insert 2 is substantially flush with the circumference of the core, so that the overlapping portions of the insert form a channel through which the end of the film strip 3 can be introduced (see Fig. 2). The tongues or hooks 2a and 2b are not nearly so thick as the height of the film perforations 3a, so that the end of the film strip 3, after being hooked in these perforations, can be swung freely without substantial bending, as shown in Figs. 3 and 4.

It will be obvious from the foregoing that my device for attaching the film to the spool core has the advantage that the film end 3b remains movable in two directions within the tubular insert 2. If one turns the spool core 1 in a clockwise direction and then in a counterclockwise direction, the free film end 3b may swing within the tube to such an extent that the end of the film strip 3 is bent only slightly, i. e. a total of less than 90 degrees. Obviously this greatly reduces the danger of breaking tearing or other injury to the film.

I claim:

1. A photographic film supporting spool core for use with daylight developing tanks and provided with means for attaching perforated film strips, which means comprises, a tubular trough in said core adjacent its periphery, a longitudinally slit tubular insert positioned in said trough, said insert being cut away centrally of said slit so as to form a single pair of curved hooks for the film perforations, said hooks underlapping the insert circumference to provide a channel for introducing the end of the film radially of said insert and to permit winding of the film in either direction without substantial bending of the film end.

2. A spool core as claimed in claim 1 wherein, measured perpendicular to the film edge, the dimension of the said hooks is substantially less than that of the film perforations.

3. In combination with a perforated photographic film storage spool having an axial tubular trough positioned in its periphery, an expansible convoluted insert positioned in said trough and having overlapping inner and outer edges, the inner edge being cut away along a central portion of its extent to form a pair of spaced film retaining hooks underlying the outer edge.

BABETTE VIKTORIA LESJAK,
*Executrix of the estate of Michael Lesjak, deceased.*

References Cited in the file of this patent

UNITED STATES PATENTS

| Number | Name | Date |
|---|---|---|
| 866,039 | La May | Sept. 17, 1907 |
| 1,118,689 | Sharlow | Nov. 24, 1914 |
| 1,498,133 | Swem et al. | June 17, 1924 |
| 2,151,536 | Sperry | Mar. 21, 1939 |
| 2,384,621 | Isaac | Sept. 11, 1945 |